July 31, 1956 L. W. DROEL 2,757,241

TELEPHONE SUBSET

Filed Dec. 30, 1952 2 Sheets-Sheet 1

INVENTOR.
LOUIS W. DROEL
BY T. L. Bowes
ATTORNEY

INVENTOR.
LOUIS W. DROEL
BY
T. L. Bowes
ATTORNEY

United States Patent Office 2,757,241
Patented July 31, 1956

2,757,241

TELEPHONE SUBSET

Louis W. Droel, Rochester, N. Y., assignor, by mesne assignments, to General Dynamics Corporation, a corporation of Delaware Application December 30, 1952, Serial No. 328,735

2 Claims. (Cl. 179—100)

This invention relates to telephone substation apparatus and more particularly to telephone subscriber subsets.

Telephone substation equipment commonly includes an instrument comprising a handset having incorporated therein a transmitter and receiver on opposite ends of a hand gripping device or handle together with a subset having a hookswitch, a ringer, a dial and other associated parts mounted on a suitable base within a shell or housing; there being a suitable cradle portion provided on the subset to receive the handset when the instrument is not being used.

As is well known, a telephone subset in a rural system may be provided with a two-step hookswitch which allows subscribers on a party line to remove the telephone instrument from its cradle to partially operate the hookswitch, thereby connecting the receiver but not the transmitter in the instrument to the telephone line. In this condition, the subscriber can monitor the line to determine whether the line is in use and whether dialing is in progress by another party on the same line. Should the subscriber remove his receiver during the time that another subscriber on the same line is in the act of dialing, the monitoring subscriber will not interfere with the transmission of dial impulses to the central office and at the same time will be informed that the line is in use. On being so informed, he thereupon returns his instrument to its cradle to disconnect the receiver from the line. Had the subscriber found the line idle, he would thereupon operate a button, lever or other means under his control to allow the contact springs controlled by the cradle member of the telephone subset to operate further to complete the second step. Upon completion of this further operation, the transmitter of the instrument is connected to the telephone line thereby seizing the line for use by the subscriber. When the subscriber has finished using the telephone, he returns the instrument to the cradle and disconnects both transmitter and receiver from the telephone line. He also restores the operating mechanism he used to cut the transmitter into the line and prepares it for another cycle of operation such as was described above.

It is an object of the present invention to provide in a telephone subset a new and improved hookswitch mechanism to provide two-step hookswitch operation.

Another object of the invention is to provide in a telephone subset a new and improved mounting for a hookswitch mechanism as a complete unit of assembly within the subset.

Still another object is to provide, in a telephone subset, a new and improved arrangement of an operating plunger which controls the operation of a hookswitch mechanism.

The features of this invention which are believed to be novel are set forth with particularity in the appended claims. The invention itself, both as to its organization and manner of operation together with further objects and advantages thereof, may be best understood by reference to the following description taken in connection with the accompanying drawings in which Fig. 1 is a perspective view of an assembled subset showing the relationship of the cradle and hookswitch control means;

A more complete description of the general arrangement and operation of the other features of the herein described telephone subset may be found in the copending application of Louis W. Droel et al., Serial No. 283,941, filed April 23, 1952, assigned to the same assignee as the present application.

Figure 1:
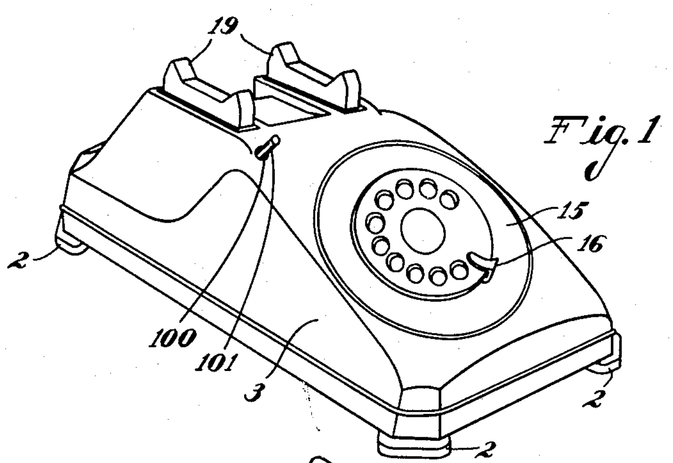
Figures 2, 3:
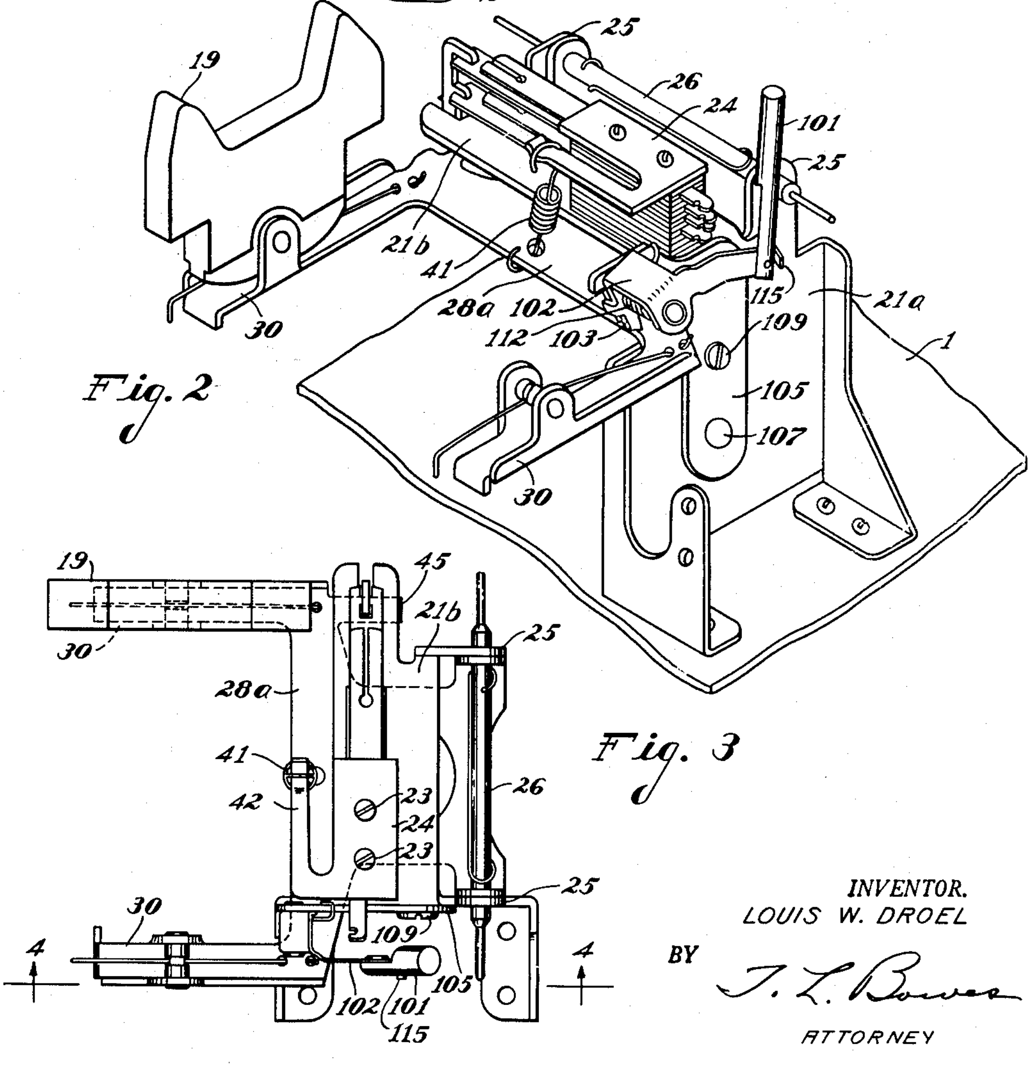
Fig. 2 is a partial perspective view of the hookswitch mechanism after the shell has been removed.
Fig. 3 is a plan view of the hookswitch mechanism.

Referring to the drawings in greater detail and more particularly to Figs. 1 to 3, inclusive, the telephone subset comprises a base 1 mounted on feet or pedestals 2. It should be noted that other apparatus such as the dial, ringer, induction coil, etc., that is normally mounted on the base of the subset has not been shown in Fig. 2, since this equipment bears no relationship to the present invention. A support comprising vertical member **21*a* and horizontal member 21*b* is carried by base 1. On opposite sides of the horizontal member are formed ears 25. These ears are bored to receive the pin 26 which acts as a pivot on which the hookswitch member 28 is suspended. The hookswitch member is generally Y-shaped comprising flat portion 28*a* and the formed arm sections 30**, constituting the two arms of the Y.

Plunger pieces 19 are mounted pivotally on hookswitch arm sections 30. When the shell 3 is in place on base 1, these plunger pieces are extended through suitable openings in the shell. The upper sides of the plunger pieces are shaped to form cradle portions to receive the telephone instrument (not shown in the drawing).

A helical spring 41 is connected between the flat portion **28*a* of the hookswitch member and the clamping plate 42, which is secured to support 21. The spring 41 urges the hookswitch member 28 and plungers 19 to travel upwards when the weight of the receiver (not shown) is removed from plunger pieces 19**.

Figure 13:
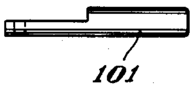
Fig. 13 shows details in connection with the hookswitch contact springs.

As shown in Figs. 2, 3 and 13 the hookswitch contact springs 20, **20*a*, 110 and 110*a* are mounted on support 21*b*. They are suitably insulated from each other and from support 21*b*, and are held in place by clamping plate 24 and screws 23. Springs 20*a* and 110*a* carry pusher 43 of insulating material. Pusher 43 is acted upon by projecting member 45 of the hookswitch member 28. When the hookswitch member 28 and plunger members 19 are depressed to their normal positions, springs 20*a* and 110*a* which are normally biased to contact making positions, are broken from contact with springs 20 and 110, respectively, by the downward pressure of arm 45 on the lower leg of pusher 43. When the plunger members 19 are released, they and the hookswitch member rise under the action of helical spring 41 to allow member 45 to rise. When member 45 rises, pusher 43 is released whereby the tension in springs 20*a* and 110*a* allows them to return to establish contact with springs 20 and 110, respectively. These pairs of contact springs are so adjusted that as member 45 rises, springs 110 and 110a will establish contact at some point in their travel before springs 20 and 20a** establish contact.

Figure 4:
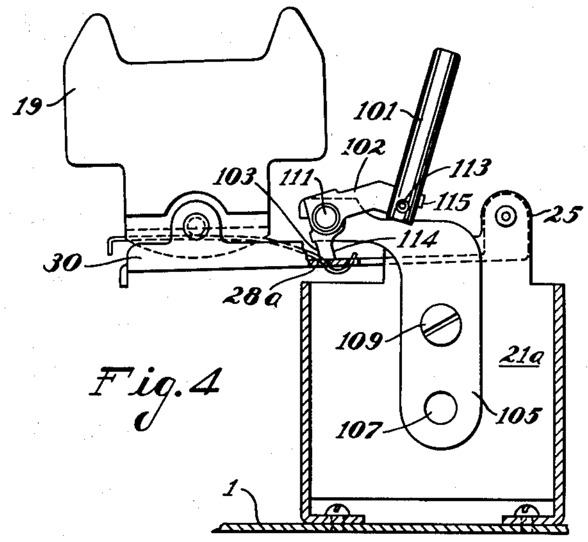
Fig. 4 is a section of an elevation of the hookswitch mechanism taken through section 4—4 shown in Fig. 3.
Figure 5:
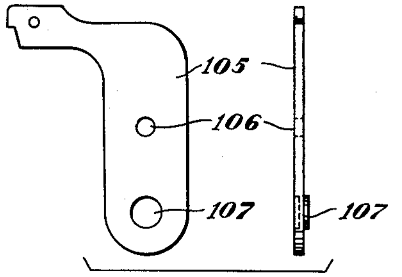
Figs. 5 and 6 are a side and front elevation and plan details, respectively, of the latching mechanism mounting bracket.
Figure 6:
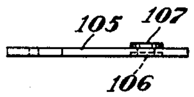
Figure 7:
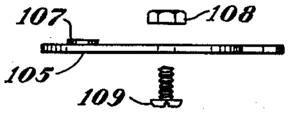
Fig. 7 is a front elevation detail of the latching mechanism and an exploded view of the mounting screw and nut.
Figure 8:
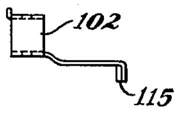
Figs. 8, 9 and 10 are a plan, side and front elevation details of the latching mechanism.
Figure 10:
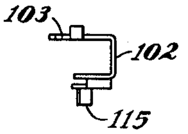
Figure 9:
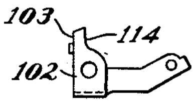
Figure 11:
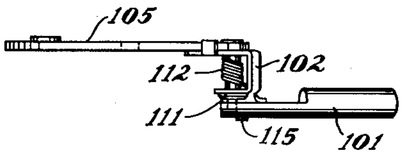
Fig. 11 is a detail showing the arrangement of the securing of the latch to the mounting bracket.
Figure 12:
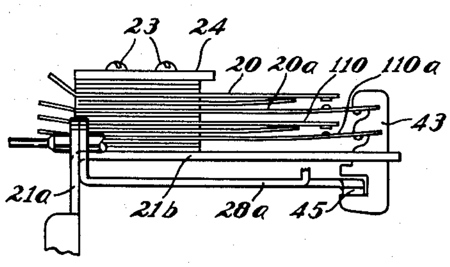
Fig. 12 is a detail of the operating plunger for controlling the latch.

As shown in Figs. 2 to 4, inclusive, and also in some detail in Figs. 5 to 7, inclusive, a bracket 105 which is a part of a two-step latching mechanism assembly is fixed to support 21a as by means of suitable fastening means such as a screw 109 which passes through opening 106 in the bracket and a corresponding hole in vertical portion 21a of the support. The term "opening" where used herein is intended to include any suitable hole, recess or the like. Means to position the above mentioned bracket horizontally and vertically with respect to the support 21a is provided by passing the fastening means 109 through the positioned holes in the support and the bracket.

In order to determine the angular position of the bracket relative to the support, a position aligning boss 107 is provided on bracket 105. When the bracket is in the desired angular position on support 21a, boss 107 engages a second hole, recess, or the like, in support 21a. Thus bracket 105 is completely positioned relative to support 21a by use of only one fastening.

Referring to Fig. 4, and Figs. 8 to 11, inclusive, the latch 102 is pivotally mounted on bracket 105 by means of pin 111. A spring 112 is wound around pin 111 with one end engaging the latch 102 and the other end hooked over bracket 105. Spring 112 urges the latch to assume its normal position. With bracket 105 carrying latch 102 in position on support 21a, the latch's normal position is defined as that position where latch member 103 engages the flat portion 28a of the hookswitch member as the hookswitch arm is moved upward from its normal position.

The purpose of springs 20, 20a, 110 and 110a is to control the connection of the transmitter and receiver carried in the telephone instrument to the telephone party line. In the arrangement herein described, the contact spring combination is extremely simple for purposes of demonstration, it being understood that any combination of more than two sets of contacts arranged for sequence operation might be provided to meet the needs of various telephone substation circuits which use two-step hookswitch operation. In the instant case, the combination comprising two sets of break contacts is arranged for use with the instrument transmitter in series with contact set 20–20a and the receiver in series with contacts 110–110a. No attempt has been made to show the circuit or instrument in the accompanying figures since they bear no relationship to the invention and are simple enough to be described without the use of a drawing.

An operating means such as plunger 101 controls the hookswitch mechanism. This plunger is pivotally attached to operating arm or latch 102 by means of pin 113. When shell 3 is in place on base 1, bracket 105 carrying the latch 102 is positioned on support 21a and 21b so that the free end of plunger 101 passes through a suitably positioned hole 100 in shell 3. The walls of the hole 100 are arranged to guide the upper end of the plunger 1 which protrudes through the hole and is accessible from the outside of the subset. The plunger 101 is movable along a path generally parallel to its major axis.

When plunger pieces 19 and the hookswitch member 28 have been allowed to move upward from their normal positions, and after contact has been established between springs 110 and 110a but before contact is established between springs 20 and 20a, the upper surface of flat portion 28a of the hookswitch member engages the end of member 103 of latch 102. Means in the form of this engagement between section 28a and member 103 limits the travel of the hookswitch arm to prevent the hookswitch arm from traveling further at this time. The first of the two steps taken by the hookswitch is then completed. The circuit of the instrument receiver is now closed to the telephone party line; the circuit of the transmitter, however, is still open since contacts 20 and 20a are still broken.

After engagement between portion 28a of the hookswitch member and member 103 is established, control plunger 101 may be depressed against the tension of spring 112 to rotate the latch 102 about pin 111. This direction of rotation will arbitrarily be designated as "forward." This rotation is sufficient to move member 103 to a point where it no longer engages member 28 of the hookswitch arm.

After its disengagement from member 103 of the latch, the hookswitch member is released to travel upward under the influence of helical spring 41 to its limiting position. During this travel, member 45 advances sufficiently to allow pusher 43 to advance contact 20a sufficiently to establish contact with spring 20. This completes the second of the two steps taken by the hookswitch. With springs 20 and 20a in contact, the circuit of the instrument transmitter is closed to the telephone line.

When pressure is removed from the control plunger 101, latch 102 rotates in the reverse direction under the influence of spring 112 until surface 114 of member 103 rests against the vertical edge of the flat portion 28a of the hookswitch member.

When plunger pieces 19 are depressed thereafter, they and the hookswitch arm return to their normal positions against the tension of helical spring 41. As the hookswitch member travels downward, member 45 travels downward to cause contact springs 20a and 110a to also move downward and break contact with contact springs 20 and 110 to disconnect both instrument transmitter and receiver from the telephone line. Also during this downward movement, surface 114 of member 103 of the latch 102 disengages from the vertical surface of flat portion 28 of the hookswitch arm. Subsequent to this disengagement, latch 102 is freed to rotate in its reverse direction on pin 111 under the influence of spring 112 to return to its normal position.

After the above described operations have taken place, the equipment is again in its normal position and is ready to be recycled in a manner similar to the one described above.

It should be noted that if the plunger pieces 19 are allowed to advance from their normal position to the point where flat portion 28a of the hookswitch member contacts member 103 of latching mechanism 102 and the plunger arms are again depressed to their normal position without the operation of control plunger 101, arm 45 is again moved downward to break the contact between springs 110 and 110a. When the plunger pieces are in their normal positions under these conditions, the instrument receiver is disconnected from the telephone line, and the subset is otherwise normal and ready for reuse in the manner previously described.

Referring to Figs. 1 and 4, it should be noted that when the subset is standing with shell 3 removed, plunger 101 is supported in the approximate position that it assumes when the shell is in place by tab 115 on the operating arm end of member 102. The tab is positioned relative to plunger 101 so that the plunger can rotate through an arc sufficient to allow its action previously described to take place without binding between shell 3 and plunger 101. The plunger being thus positioned, the process of introducing shell 3 into engagement with the subset is simplified by removing the necessity of otherwise holding plunger 101 in a position to pass through opening 100 as the shell is dropped into place.

In the foregoing description, an improved subset having a two-step hookswitch arrangement has been described. In particular, a novel arrangement accurately locating and aligning the bracket carrying the two-step latching mechanism (an assembly comprising bracket 105, latch and operating arm 102, and plunger 101), responsible for the two-step action with relation to the rest of the hookswitch mechanism has been disclosed. In addition, a novel arrangement in a telephone subset latching mechanism making use of a pivoted operating plunger wherein one end of the plunger is pivotally attached and positioned relative to the subset base so that the other end is positioned and aligned by means of a shell or housing which is in turn positioned and aligned relative to the base is disclosed.

While I have shown and described a particular embodiment of my invention, it will be obvious to those skilled in the art that changes and modifications may be made without departing from my invention in its broader aspects. I therefore aim in the appended claims to cover all such changes and modifications as fall within the true spirit and scope of my invention.

What I claim is:

1. In a telephone substation of the type comprising a base, a hookswitch mechanism including an operating member having a normal and a plurality of operated positions for sequentially controlling groups of circuits in said subset; means for urging said hookswitch member to travel from its normal toward its operated positions, a latching mechanism assembly comprising a mounting bracket and means for retaining said member in a first of said operated positions, and means for effecting the movement of said latch to allow said urging means to move said member to the ultimate of said operated positions; the improvement which comprises a support fixed to said base for carrying said latching and said hookswitch mechanism assemblies in combination with means comprising fastening means passing through a first opening in said support and a corresponding opening in said bracket and a boss on said bracket cooperating with a second opening in said support for locating said latching mechanism assembly relative to said support and said member.

2. In a telephone substation of the type comprising a base; a shell having an aperture therein, said shell being carried and located relative to said base; a hookswitch mechanism for sequentially controlling groups of circuits carried by and located relative to said base; and a latching mechanism assembly comprising a mounting bracket, a latch pivotally mounted on said bracket, and an operating plunger pivotally attached to said latch for controlling said hookswitch mechanism; the improvement which comprises a support carried and positioned relative to said base for carrying said hookswitch and said latching mechanism assemblies, in combination with means comprising fastening means passing through a first opening in said support and a corresponding opening in said bracket and a boss on said bracket cooperating with a second opening on said support for positioning said assembly relative to said aperture in said shell, said plunger extending through said aperture and being guided by the walls of said aperture formed in said shell.

References Cited in the file of this patent

UNITED STATES PATENTS

| | | |
|---|---|---|
| 1,226,389 | Schulz | May 15, 1917 |
| 1,247,796 | Dean | Nov. 27, 1917 |
| 1,432,883 | Lysons | Oct. 24, 1922 |
| 2,494,449 | Obergfell | Jan. 10, 1950 |
| 2,494,450 | Obergfell | Jan. 10, 1950 |
| 2,559,651 | McLarn | July 10, 1951 |

FOREIGN PATENTS

| | | |
|---|---|---|
| 615,952 | Great Britain | Jan. 13, 1949 |